No. 787,076. Patented April 11, 1905.

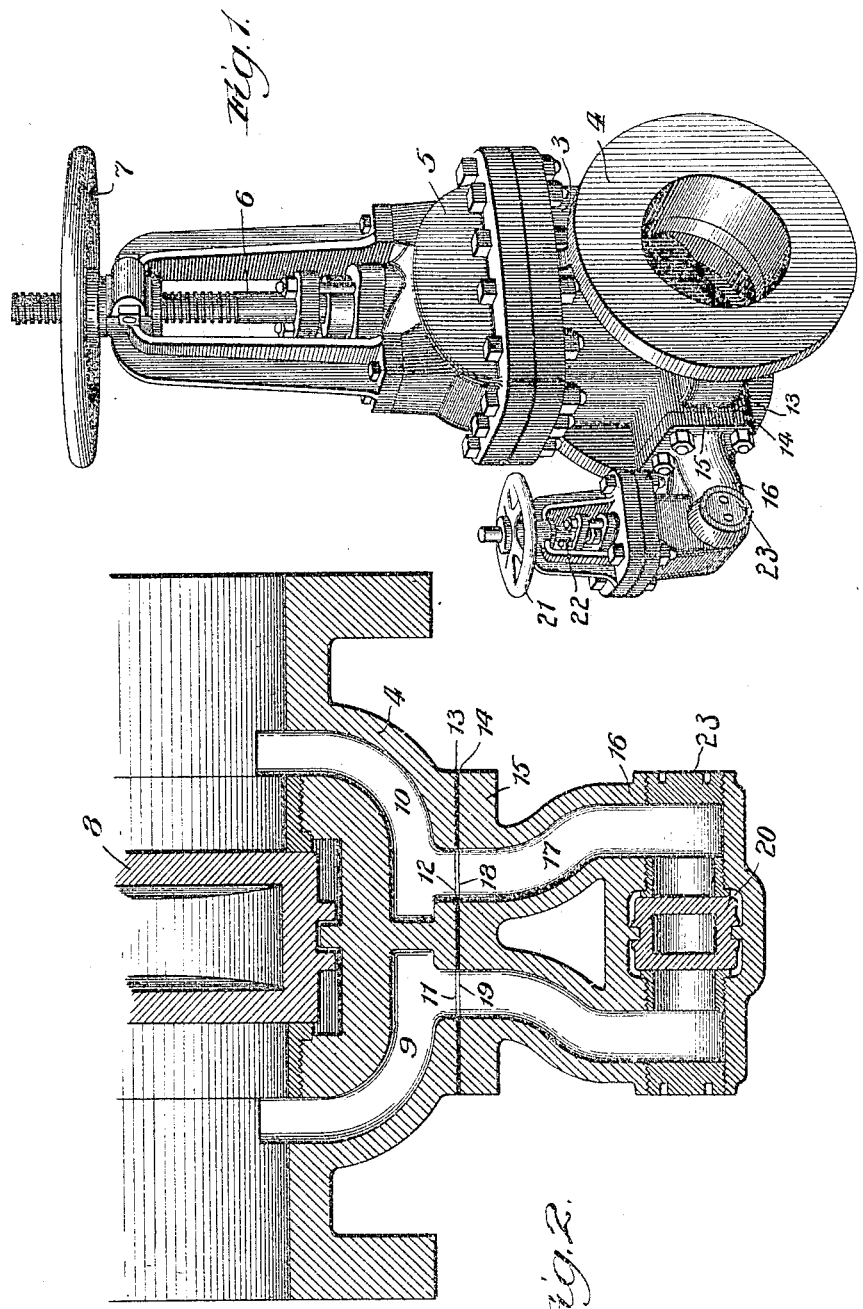

UNITED STATES PATENT OFFICE.

ANDREW J. CALDWELL, OF CHICAGO, ILLINOIS, ASSIGNOR TO CRANE COMPANY, OF CHICAGO, ILLINOIS, A CORPORATION OF ILLINOIS.

VALVE.

SPECIFICATION forming part of Letters Patent No. 787,076, dated April 11, 1905.

Application filed January 30, 1902. Serial No. 91,934.

*To all whom it may concern:*

Be it known that I, ANDREW J. CALDWELL, a citizen of the United States of America, residing at Chicago, in the county of Cook and State of Illinois, have invented certain new and useful Improvements in Valves, of which the following, taken in connection with the accompanying drawings, is a specification.

This invention has reference to the provision of a by-pass valve, as it is called in the art, which will be much cheaper to construct than those heretofore commonly used, and which will possess greater facility for removal and repair, and replacement, than those with which I am familiar, which have been heretofore used.

A further object of my invention is the provision of a valve having a body, a main passage therethrough, and means for controlling said passage, in combination with a by-pass device comprising a casing, a by-passage through said casing, means for controlling said by-passage, and connecting passages in said main valve body, having port openings in the side of said main valve body, and port openings for said by-passage, constructed to register with the port openings in the side of the main valve body, whereby the by-pass device can be secured to the main valve body, in operative position, by the use of a single flange and set of bolts, and a single gasket joint, in place of the plurality of flanges and gasket joints commonly employed in the prior art devices, in which it is customary to use a valve for a by-pass valve of usual construction, and attach the same by means of two flange ells, making in all four gasket joints and four flanges and sets of bolt connections, to secure the attachment of the by-pass valve to the body of the main valve.

The above, as well as such other objects as may hereinafter appear, I attain by means of a construction which I have illustrated in preferred form in the accompanying drawings, in which—

Figure 1 is a perspective view of a valve embodying my improvement, and

Figure 2 is a view in section, showing the by-pass passages, and the passages in the main body of the valve with which said by-passage connects.

The main valve, which as a whole I have marked 3, has a main valve body 4, a bonnet 5, and an operating stem 6, and hand-wheel 7, which, save as to the by-pass device and its attachment which I am about to describe, are substantially the same as are usually employed in this class of valve mechanism. While I have shown a gate valve, it is obvious that my improvements are applicable to other types of valve construction, and I do not therefore wish to be understood as limiting myself in this respect to the precise form shown.

The valve body 4 of the main valve, is provided with the wedge 8, which is of any preferred construction, and on each side of the wedge 8 there is a by-passage leading off laterally, one of which I have marked 9 and the other 10, the passages terminating in ports 11 and 12 on a smooth or plane surface 13, which forms a seat at one side of the main valve body, and against which, with the packing gasket 14 interposed, rests a corresponding face or seat 15, of a by-pass device body 16, having a by-passage 17, the two opposite ends of which are formed with the ports 18 and 19 as shown, and which is arranged to be controlled by some suitable means, such for example, as the gate valve 20 indicated in section in Figure 2.

The valve 20 as shown is to be operated by means of a hand-wheel 21 and connected spindle 22, which may be of any preferred construction.

The use of the gate valve 20 avoids largely the difficulty of opening against the pressure, and it may readily be put in place, as also the valve seats, through the opening in the top of the supplementary casing 16. The straight passages on the sides of the valve extend through the walls of the casing, to allow of examination and cleaning of the by-pass valve, being closed by screw plugs 23.

Having thus described my invention, what I claim as new, and desire to secure by Letters Patent, is—

The combination with a main gate valve and casing therefor having passages under the gate valve, of a supplementary casing provided with passages registering with those in the main casing and connected by a straight passage, a sliding by-pass gate valve in said straight passage and means for operating said valve, the supplementary casing being provided with lateral openings at the two ends of the straight passage on the respective sides of the valve, and being closed by removable plugs therein, for inspection of the valve and its seats, substantially as described.

In testimony whereof I have hereunto set my hand in the presence of two subscribing witnesses.

ANDREW J. CALDWELL.

Witnesses:
PAUL SYNNESTVEDT,
PAUL CARPENTER.